United States Patent
Kobashikawa et al.

(10) Patent No.: US 11,568,761 B2
(45) Date of Patent: Jan. 31, 2023

(54) PRONUNCIATION ERROR DETECTION APPARATUS, PRONUNCIATION ERROR DETECTION METHOD AND PROGRAM

(71) Applicant: NIPPON TELEGRAPH AND TELEPHONE CORPORATION, Chiyoda-ku (JP)

(72) Inventors: Satoshi Kobashikawa, Yokosuka (JP); Ryo Masumura, Yokosuka (JP); Hosana Kamiyama, Yokosuka (JP); Yusuke Ijima, Yokosuka (JP); Yushi Aono, Yokosuka (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 343 days.

(21) Appl. No.: 16/648,392

(22) PCT Filed: Sep. 13, 2018

(86) PCT No.: PCT/JP2018/033936
§ 371 (c)(1),
(2) Date: Mar. 18, 2020

(87) PCT Pub. No.: WO2019/065263
PCT Pub. Date: Apr. 4, 2019

(65) Prior Publication Data
US 2020/0219413 A1 Jul. 9, 2020

(30) Foreign Application Priority Data
Sep. 26, 2017 (JP) .............................. JP2017-185003

(51) Int. Cl.
*G10L 15/187* (2013.01)
*G09B 19/06* (2006.01)
(Continued)

(52) U.S. Cl.
CPC ............... *G09B 19/06* (2013.01); *G09B 5/04* (2013.01); *G10L 15/187* (2013.01); *G10L 15/1815* (2013.01); *G10L 15/19* (2013.01)

(58) Field of Classification Search
CPC ... G10L 15/1815; G10L 15/187; G10L 15/19; G10L 13/00; G10L 15/183; G10L 15/32;
(Continued)

(56) References Cited

U.S. PATENT DOCUMENTS 6,963,841 B2 * 11/2005 Handal .................... G09B 5/04
704/251
7,996,209 B2 * 8/2011 Jang ........................ G10L 15/22
704/251

(Continued)

OTHER PUBLICATIONS

International Search Report dated Nov. 27, 2018 in PCT/JP2018/033936 filed on Sep. 13, 2018, 1 page.
(Continued)

*Primary Examiner* — Abdelali Serrou
(74) *Attorney, Agent, or Firm* — Oblon, McClelland, Maier & Neustadt, L.L.P.

(57) ABSTRACT

The present invention provides a pronunciation error detection apparatus capable of following a text without the need for a correct sentence even when erroneous recognition such as a reading error occurs. The pronunciation error detection apparatus comprises: a speech recognition part that recognizes the speech in speech data based on a speech recognition model for a non-native speaker, and outputs speech recognition results, reliability and time information; a reliability determination part that outputs the speech recognition results with higher reliability than a predetermined threshold and the corresponding time information as the determined speech recognition results and the determined time information; and a pronunciation error detection part that outputs a phoneme as a pronunciation error when reliability for each
(Continued)

phoneme in the speech recognition results using the native speaker speech recognition model under a weakly constraining grammar is greater than the reliability of the corresponding phoneme in the speech recognition results using the native speaker acoustic model under a constraining grammar in which the determined speech recognition results are correct for the speech data in a segment specified by the determined time information.

31 Claims, 13 Drawing Sheets

(51) Int. Cl.
*G09B 5/04* (2006.01)
*G10L 15/18* (2013.01)
*G10L 15/19* (2013.01)

(58) Field of Classification Search
CPC ..... G10L 15/22; G10L 15/063; G10L 15/005; G10L 17/00; G10L 2015/081; G10L 2015/221; G10L 25/51; G10L 15/00; G10L 15/02; G10L 15/14; G10L 13/04; G10L 13/10; G10L 2013/105; G10L 2015/025; G10L 15/06; G10L 15/04; G10L 15/142; G10L 15/16; G10L 15/26; G10L 15/30; G10L 2015/088; G10L 25/60; G10L 13/08; G10L 15/07; G10L 15/197; G10L 17/26; G10L 2015/225; G10L 21/0208; G10L 15/144; G10L 2015/227; G10L 21/055; G09B 19/06; G09B 5/04; G06F 3/04842; G06F 3/04847; G06F 3/0486; G06F 3/04883; G06F 40/242; G06F 40/40; G06F 3/0488; G06F 40/174; G06F 40/58; G06F 3/0484; G06F 3/167; G06F 40/232; G06F 40/55
See application file for complete search history.

(56) References Cited

U.S. PATENT DOCUMENTS

| | | | |
|---|---|---|---|
| 8,234,107 B2* | 7/2012 | Goyal | G06F 16/31 704/4 |
| 9,076,347 B2* | 7/2015 | Komissarchik | G09B 19/06 |
| 9,613,638 B2* | 4/2017 | Loukina | G09B 19/04 |
| 9,652,999 B2* | 5/2017 | Yoon | G10L 15/26 |
| 9,767,792 B2* | 9/2017 | Ge | G10L 15/14 |
| 10,068,569 B2* | 9/2018 | Stanley | G09B 19/06 |
| 10,319,369 B2* | 6/2019 | Cassagne | G10L 15/142 |
| 10,468,015 B2* | 11/2019 | Pike | G10L 13/04 |
| 2005/0277094 A1* | 12/2005 | Davidson | G09B 7/02 434/323 |
| 2008/0027731 A1* | 1/2008 | Shpiro | G09B 5/06 704/E11.001 |
| 2009/0239201 A1* | 9/2009 | Moe | G09B 7/02 704/8 |
| 2011/0270612 A1* | 11/2011 | Yoon | G10L 15/26 704/E15.005 |

OTHER PUBLICATIONS

Yue, J. et al., "DNN-based GOP Calculated on Shadowing Speeches and Its Approximation to Their Manually Rated Scores," Transactions of the Acoustical Society of Japan, 2-P-31, Mar. 2017, pp. 349-352.

* cited by examiner

PRONUNCIATION ERROR DETECTION APPARATUS, PRONUNCIATION ERROR DETECTION METHOD AND PROGRAM

TECHNICAL FIELD

The present invention relates to a pronunciation error detection apparatus, a pronunciation error detection method and a program.

BACKGROUND ART

An example of prior arts relating to pronunciation evaluation in language learning is Non-patent literature 1. A GOP score calculation apparatus 9 in Non-patent literature 1 includes a speech language data storage part 91a, a phoneme typewriter storage part 91b, an English acoustic model storage part 91c, a phoneme alignment generation part 91 and a GOP score calculation part 92. The phoneme alignment generation part 91 generates a phoneme alignment based on speech language data (consisting of speech data and text data), a phoneme typewriter and an English acoustic model (S91). The GOP score calculation part 92 calculates a GOP score based on the generated phoneme alignment (S92).

PRIOR ART LITERATURE

Non-Patent Literature

Non-patent literature 1: Juewei Yue, Fumiya Shiozawa, Shohei Toyama, Anna Maria Chizue Hata, Yutaka Yamauchi, Kayoko Ito, Daisuke Saito, Nobuaki Minematsu, "DNN-based GOP Calculated on Shadowing Speeches and Its Approximation to Their Manually Rated Scores" Transactions of the Acoustical Society of Japan, 2-P-31, March 2017

SUMMARY OF THE INVENTION

Problems to be Solved by the Invention

For the GOP score calculation apparatus 9 of Non-patent literature 1, a correct sentence to be learned is essential to GOP score calculation. Thus, learners have to read known sentences, and so it is hard to achieve learning effects in actual scenes using a target language. Erroneous readings or read errors cannot be handled either.

It is therefore an object of the present invention to provide a pronunciation error detection apparatus for which correct sentences are not essential and capable of following a text even when a misrecognition such as a reading error occurs.

Means to Solve the Problems

A pronunciation error detection apparatus of the present invention includes a first recognition model storage part, a speech recognition part, a reliability determination part, a second recognition model storage part and a pronunciation error detection part.

The first recognition model storage part stores a non-native speaker speech recognition model comprising a non-native speaker acoustic model learned using non-native speakers' data and a language model of a corresponding language. The speech recognition part performs speech recognition on the speech data based on the non-native speaker speech recognition model and outputs speech recognition results, reliability and time information of the speech recognition results. The reliability determination part outputs speech recognition results with higher reliability than a predetermined threshold and the corresponding time information as determined speech recognition results and determined time information. The second recognition model storage part stores a native speaker speech recognition model under a weakly constraining grammar comprising the native speaker acoustic model learned using the native speakers' data and a language model under a weakly constraining grammar having fewer grammar constraints than the language model. Regarding speech data in a segment specified by the determined time information, when reliability of each phoneme of the speech recognition results using the native speaker speech recognition model under a weakly constraining grammar is greater than the reliability of the corresponding phoneme of the speech recognition results by the native speaker acoustic model under grammar constraints for which the determined speech recognition results are a correct answer, the pronunciation error detection part outputs the phoneme as a pronunciation error.

Effects of the Invention

According to the pronunciation error detection apparatus of the present invention, correct sentences are not essential and it is possible to make a follow-up even when a misrecognition such as erroneous reading occurs.

DETAILED DESCRIPTION OF THE EMBODIMENTS

Figure 1:
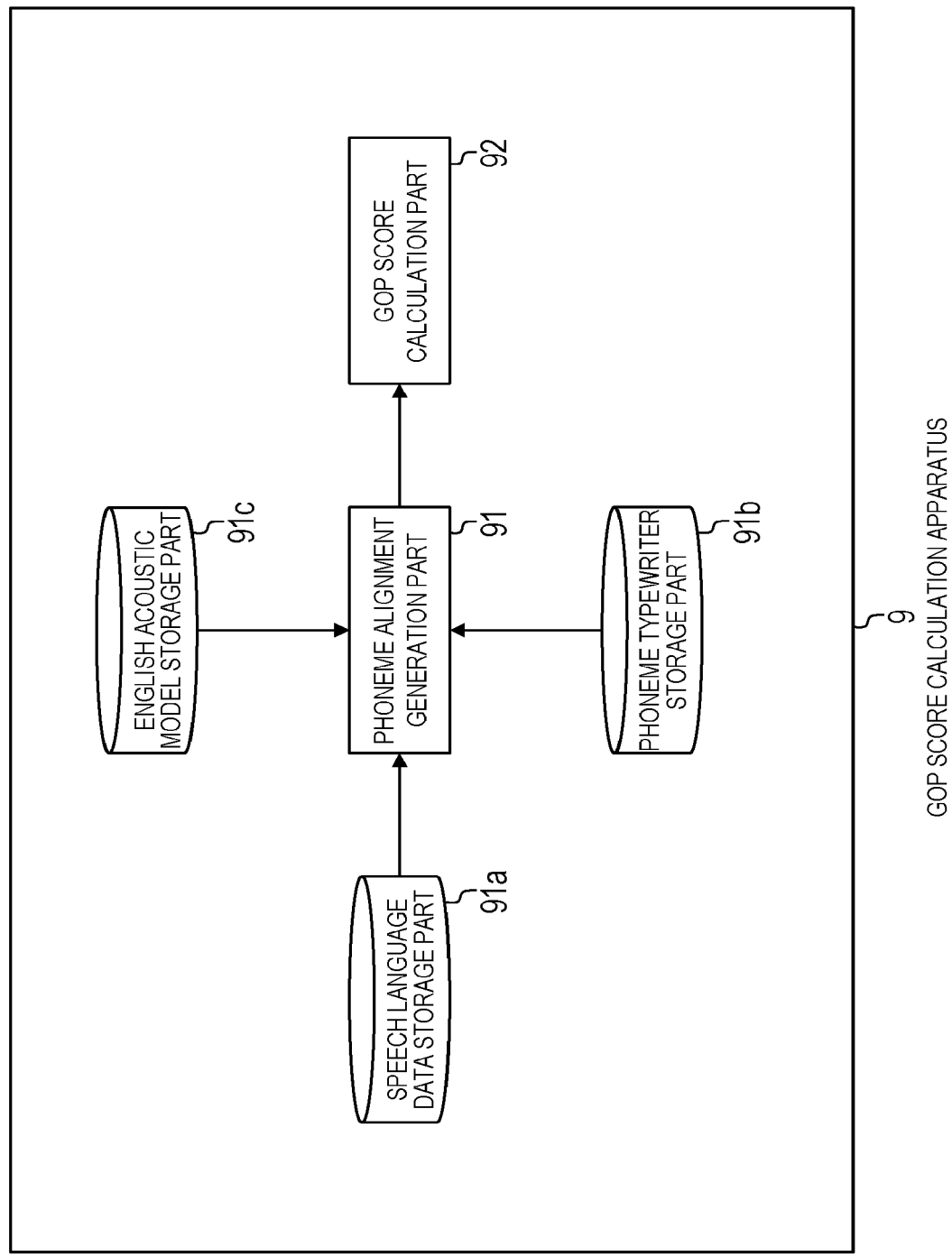
FIG. 1 is a block diagram illustrating a configuration of a GOP score calculation apparatus of Non-patent literature 1.

Hereinafter, embodiments of the present invention will be described in detail. Note that components having the same function are assigned the same reference numerals and duplicate description will be omitted.

First Embodiment

Hereinafter, a configuration and operation of a pronunciation error detection apparatus according to a first embodiment that performs speech recognition using an acoustic model of a non-native speaker and uses only speech recognition results with high reliability as targets to be pointed out as pronunciation errors will be described with reference to FIG. 2 and FIG. 3.

Figure 2:
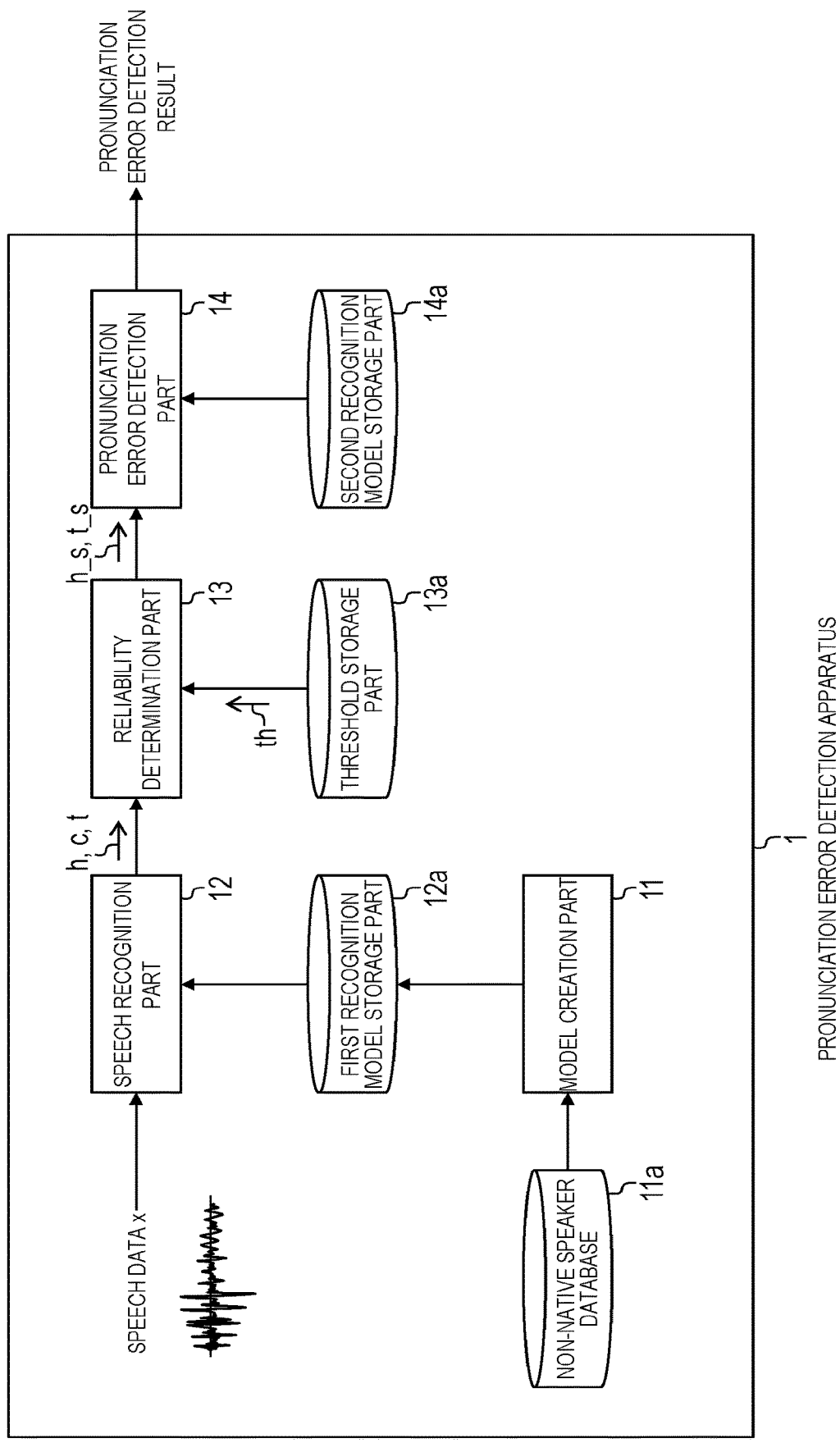
FIG. 2 is a block diagram illustrating a configuration of a pronunciation error detection apparatus of a first embodiment.
Figure 3:
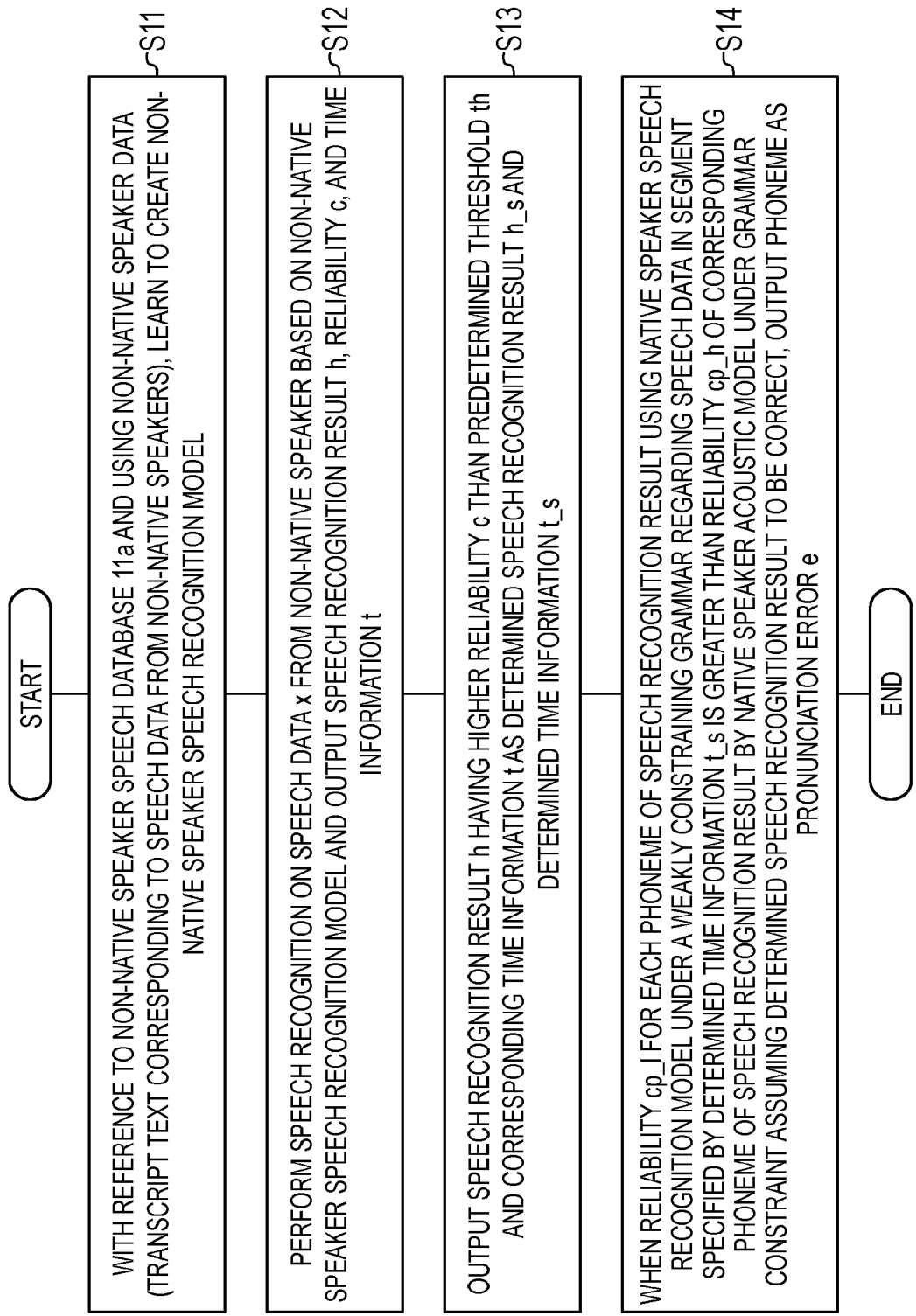
FIG. 3 is a flowchart illustrating operation of the pronunciation error detection apparatus of the first embodiment.

As shown in FIG. 2, the pronunciation error detection apparatus 1 of the present embodiment includes a non-native speaker database 11a, a model creation part 11, a first recognition model storage part 12a, a speech recognition part 12, a threshold storage part 13a, a reliability determination part 13, a second recognition model storage part 14a and a pronunciation error detection part 14. Hereinafter, the respective components will be described.

<Non-Native Speaker Database 11a>

The non-native speaker database 11a stores a large number of sets of speech data from non-native speakers and corresponding transcript texts (correct texts).

<Model Creation Part 11>

The model creation part 11 performs learning with reference to the non-native speaker database 11a and using non-native speaker data (speech data from non-native speakers and corresponding transcript text) to create a non-native speaker speech recognition model (S11). Note that the non-native speaker speech recognition model consists of a non-native speaker acoustic model learned from a speech-text pair and a language model learned from texts of the corresponding language. A speech recognition model may be learned from the non-native speaker database 11a or a non-native speaker speech recognition model may be created by receiving a speech recognition model by native speakers as input and tuning the speech recognition model by the native speakers.

The non-native speaker speech recognition model need not be created online but may be created in advance.

<First Recognition Model Storage Part 12a>

The first recognition model storage part 12a stores the above non-native speaker speech recognition model.

<Speech Recognition Part 12>

The speech recognition part 12 performs speech recognition on speech data x from a non-native speaker based on the non-native speaker speech recognition model and outputs speech recognition result h, its reliability c, and its time information t (S12). For example, a word posterior probability may be assumed to be the reliability c. The following table shows specific examples of the speech recognition result h, the reliability c and the time information t.

TABLE 1

| Recognition result h | Reliability c | Time information t |
|---|---|---|
| I | 0.85 | [0.08-0.32] |
| like | 0.95 | [0.32-0.51] |
| rice | 0.92 | [0.51-0.65] |

<Threshold Storage Part 13a>

The threshold storage part 13a stores a threshold th used for operation of the reliability determination part 13 in advance.

<Reliability Determination Part 13>

The reliability determination part 13 outputs the speech recognition result h having higher reliability c than the predetermined threshold th and the corresponding time information t as a determined speech recognition result h_s and determined time information t_s (S13). In another expression, the reliability determination part 13 outputs words whose reliability c is greater (higher) than the threshold th with respect to the speech recognition result h as the determined speech recognition result h_s and outputs the determined time information t_s corresponding to the determined speech recognition result h_s. For example, the threshold th is set to 0.9 or the like. The table below shows specific examples of the determined speech recognition result h_s and the determined time information t_s when th=0.9 is assumed.

TABLE 2

| Determined recognition result h_s | Reliability c | Determined time information t_s |
|---|---|---|
| ~~I~~ (Excluded) | ~~0.85~~ (Excluded) | ~~[0.08-0.32]~~ (Excluded) |
| like | 0.95 | [0.32-0.51] |
| rice | 0.92 | [0.51-0.65] |

<Second Recognition Model Storage Part 14a>

The second recognition model storage part 14a stores a native speaker speech recognition model under a weakly constraining grammar consisting of a native speaker acoustic model learned using native speakers' data and a language model under a weakly constraining grammar which is a grammar having fewer grammar constraints than the aforementioned language model (e.g., phoneme typewriter that allows a loop of all phonemes).

Note that the language model under a weakly constraining grammar may not be a phoneme typewriter provided in advance and may be generated separately from a phoneme sequence of the speech recognition result. For example, when a speech recognition result of rice (pronunciation symbol: rais) is outputted, a grammar such as (r/l)ais is generated.

<Pronunciation Error Detection Part 14>

When reliability cp_1 for each phoneme of a speech recognition result using a native speaker speech recognition model under a weakly constraining grammar regarding speech data in a segment specified by the determined time information t_s is greater than reliability cp_h of a corresponding phoneme of the speech recognition result by a native speaker acoustic model under a grammar constraint assuming that the determined speech recognition result is correct, the pronunciation error detection part 14 outputs the phoneme as a pronunciation error e (S14). Note that it is assumed that the phoneme can be acquired from the speech recognition result. For example, since the speech recognition result text includes a phoneme sequence such as "rice: r_a_i_s," the phoneme can be easily acquired after the speech recognition.

In another expression, the pronunciation error detection part 14 performs speech recognition using a native speaker acoustic model according to a low constraint grammar regarding speech data in the segment specified by determined time information t_s. When the score (reliability cp_1) speech-recognized using the native speaker acoustic model according to the low constraint grammar is higher than the score (reliability cp_h, for example, phoneme posterior probability) speech-recognized using the native speaker acoustic model under constraints that the phoneme sequence included in the determined speech recognition result h_s is assumed to be a correct phoneme sequence, the pronunciation error detection part 14 outputs the corresponding phoneme as a pronunciation error e (S14). When there is no phoneme whose score (reliability cp_1) corresponding to the low constraint grammar is higher than the score (reliability cp_h) corresponding to the correct phoneme sequence, the pronunciation error is assumed to be "none." By using the native speaker acoustic model for both speech recognition corresponding to the low constraint grammar and speech recognition based on the correct phoneme sequence, it is possible to execute pronunciation error detection according to determination criteria based on native speaker likelihood. Specific examples of the score (reliability cp_1) corresponding to the low constraint grammar and the score (reliability cp_h) corresponding to the correct phoneme sequence are shown below. In the examples in the table below, since the score (reliability cp_1) corresponding to the low constraint grammar is higher than the score (reliability cp_h) corresponding to the correct phoneme sequence, the phoneme is outputted as a pronunciation error e.

TABLE 3

|  | Low constraint grammar | Correct phoneme sequence |
|---|---|---|
| Speech recognition result | [lais] | [rais] |
| Score (reliability) | 0.9 | 0.7 |

At this time, when a plurality of phonemes are detected as pronunciation errors in one sentence or word, a sequence with a largest difference in scores (reliability, for example, phoneme posterior probability) between the correct phoneme and the pronunciation error phoneme may be selected as a pronunciation error detection result. Furthermore, the score difference may be outputted together with the pronunciation error detection result.

The above phoneme typewriter may be a syllable typewriter when the native language is a syllable-unit language such as Japanese.

The native speaker acoustic model may be any model learned from data including native speaker speech. For example, the native speaker acoustic model may be a mixed model of native and non-native speakers learned from data including both native speaker speech and non-native speaker speech. In this case, sensitivity in pointing out errors is weakened and excessive feedback is suppressed.

Note that the pronunciation error detection apparatus 1 of the present embodiment may include an output part that executes at least any one of a process of outputting a correct sentence and presenting it to a learner and a process of presenting speech synthesized from a correct sentence and a speech synthesized from a sentence including pronunciation errors to the learner in a comparable form.

According to the pronunciation error detection apparatus 1 of the present embodiment, since a speech recognition process of following a target language is included, correct sentences are not essential. Follow-up is possible even when erroneous recognition such as erroneous reading occurs.

Second Embodiment

Hereinafter, in addition to the functions of the first embodiment, a configuration and operation of a pronunciation error detection apparatus of a second embodiment that automatically estimates a threshold used in step S13 will be described with reference to FIG. 4 and FIG. 5.

Figure 4:
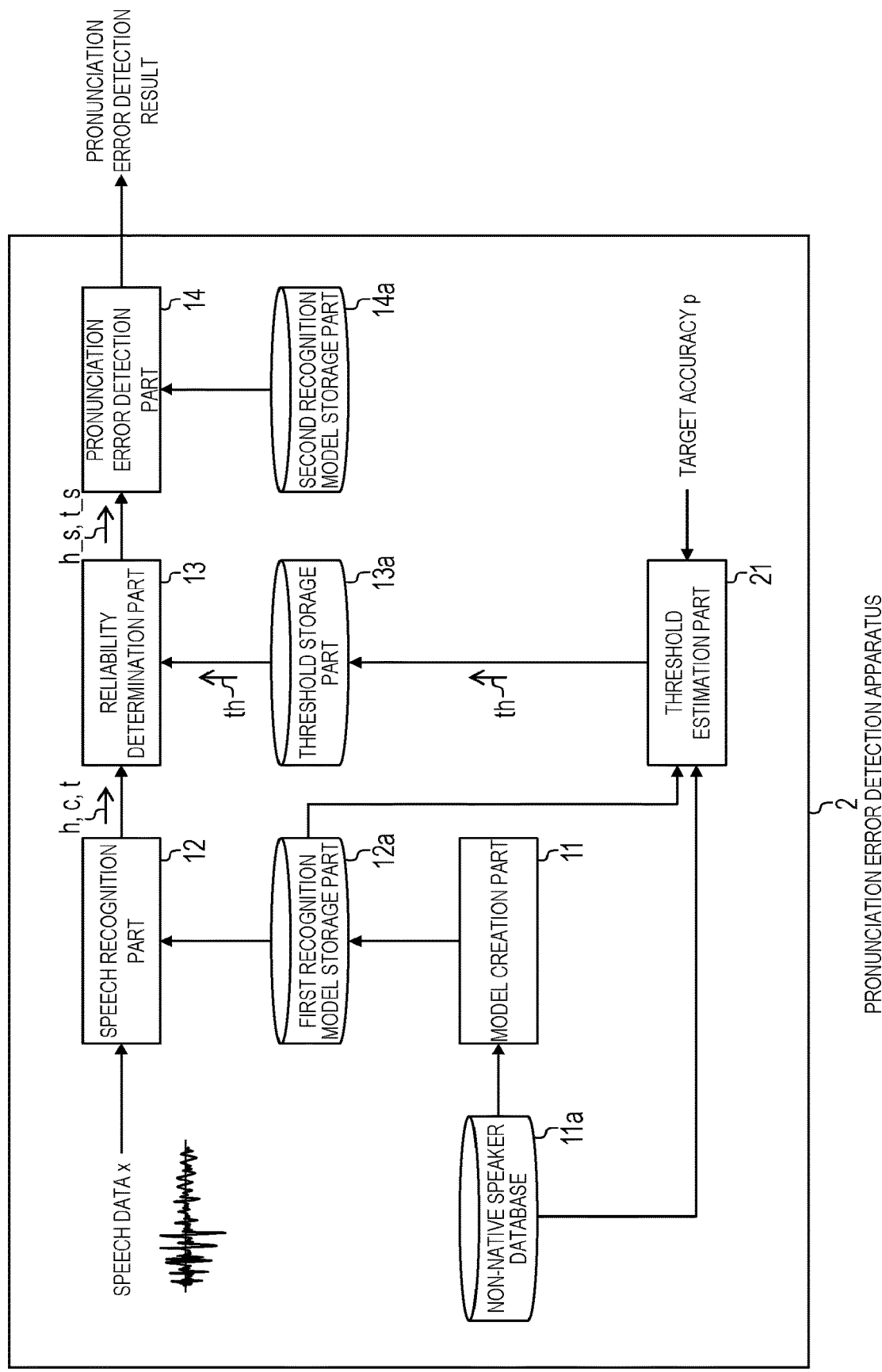
FIG. 4 is a block diagram illustrating a configuration of a pronunciation error detection apparatus of a second embodiment.
Figure 5:
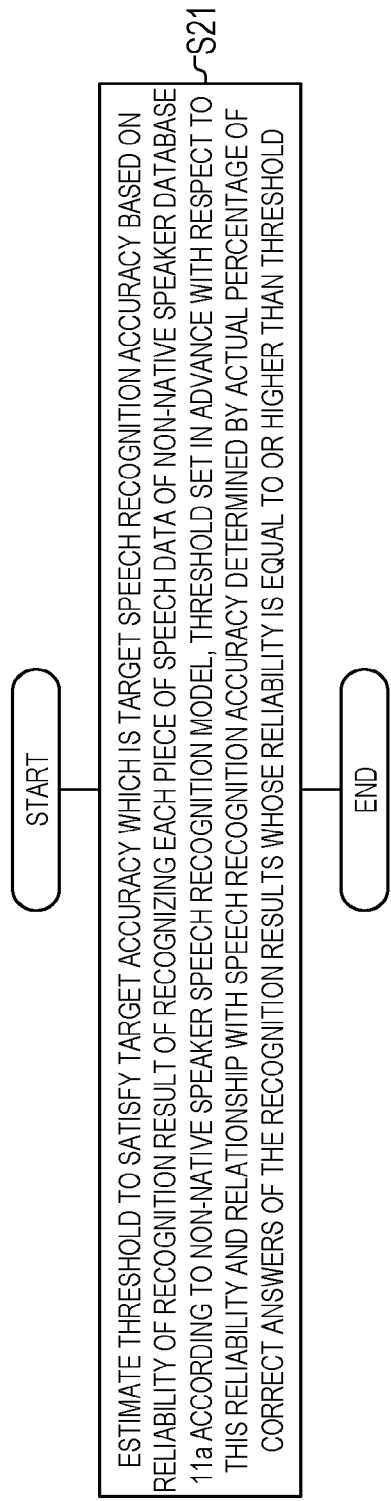
FIG. 5 is a flowchart illustrating operation of the pronunciation error detection apparatus of the second embodiment.

As shown in FIG. 4, the pronunciation error detection apparatus 2 of the present embodiment includes the non-native speaker database 11a, the model creation part 11, the first recognition model storage part 12a, a threshold estimation part 21, the threshold storage part 13a, the speech recognition part 12, the reliability determination part 13, the second recognition model storage part 14a, and the pronunciation error detection part 14. Hereinafter, operation of the threshold estimation part 21 which is a component different from those in the first embodiment will be described.

<Threshold Estimation Part 21>

The threshold estimation part 21 estimates a threshold to satisfy target accuracy which is target speech recognition accuracy based on reliability of a result of recognition of each piece of speech data of the non-native speaker database 11a according to the non-native speaker speech recognition model, a threshold set in advance with respect to this reliability and a relationship with speech recognition accuracy determined by an actual percentage of correct answers of the recognition results whose reliability is equal to or higher than a threshold (S21).

In another expression, the threshold estimation part 21 performs speech recognition on each piece of speech data included in the non-native speaker database 11a and calculates reliability of each word. Since the non-native speaker database 11a includes a correct text corresponding to each piece of speech data, it is known whether or not each speech recognition result is actually correct. That is, it is known whether or not each of the speech recognition results whose reliability is equal to or higher than a predetermined threshold is actually correct and the percentage of correct answers (speech recognition accuracy) fluctuates by raising or lowering the threshold. It is estimated that lowering the threshold will cause the percentage of correct answers (speech recognition accuracy) to decrease and raising the threshold will cause the percentage of correct answers (speech recognition accuracy) to increase. Assuming the target speech recognition accuracy is target accuracy p, the threshold estimation part 21 estimates and outputs the threshold th that satisfies the target accuracy p. A table below shows specific examples of a correspondence relationship between the threshold and speech recognition accuracy. In the specific examples in the table below, a threshold th=0.9 is estimated when the target accuracy p=90%. A threshold th=0.5 is estimated when the target accuracy p=85%.

TABLE 4

| Threshold th | Speech recognition accuracy (percentage of correct answers) |
|---|---|
| 0.0 | 80.0 |
| 0.1 | 81.0 |
| 0.2 | 82.0 |
| 0.3 | 83.5 |
| 0.4 | 84.3 |
| 0.5 | 85.3 |
| 0.6 | 86.9 |
| 0.7 | 87.3 |
| 0.8 | 89.0 |
| 0.9 | 90.1 |

According to the pronunciation error detection apparatus 2 of the present embodiment, in addition to the effects of the first embodiment, thresholds used in step S13 can be automatically estimated according to the target accuracy.

Third Embodiment

Hereinafter, in addition to the functions of the first embodiment, in consideration of the fact that the recognition rate with speakers having good pronunciation ability deteriorates, a configuration and operation of a pronunciation error detection apparatus of a third embodiment configured to add native speakers' speech data to data which is a base of a native speaker acoustic model will be described with reference to FIG. 6 and FIG. 7.

Figure 6:
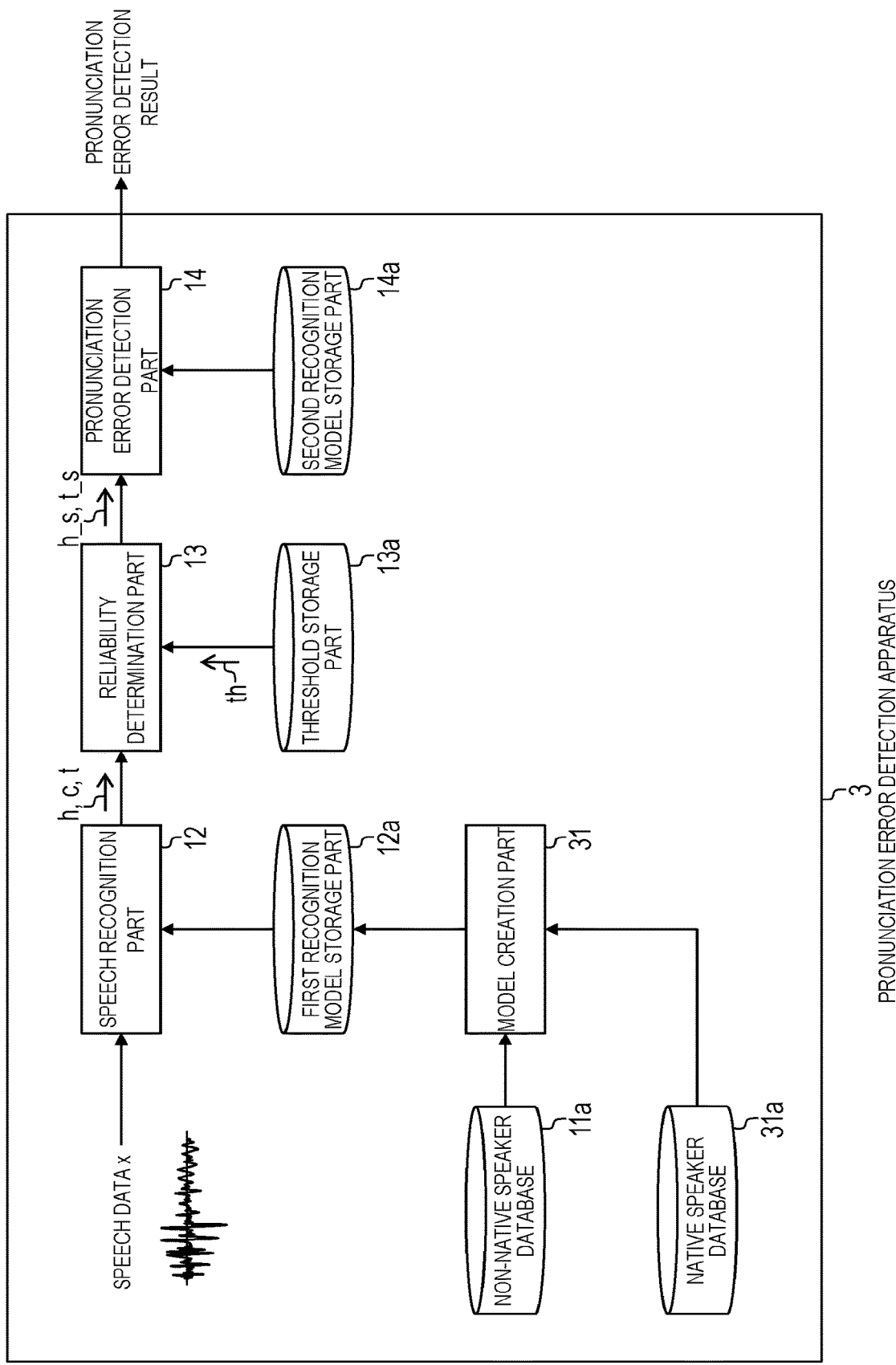
FIG. 6 is a block diagram illustrating a configuration of a pronunciation error detection apparatus of a third embodiment.
Figure 7:
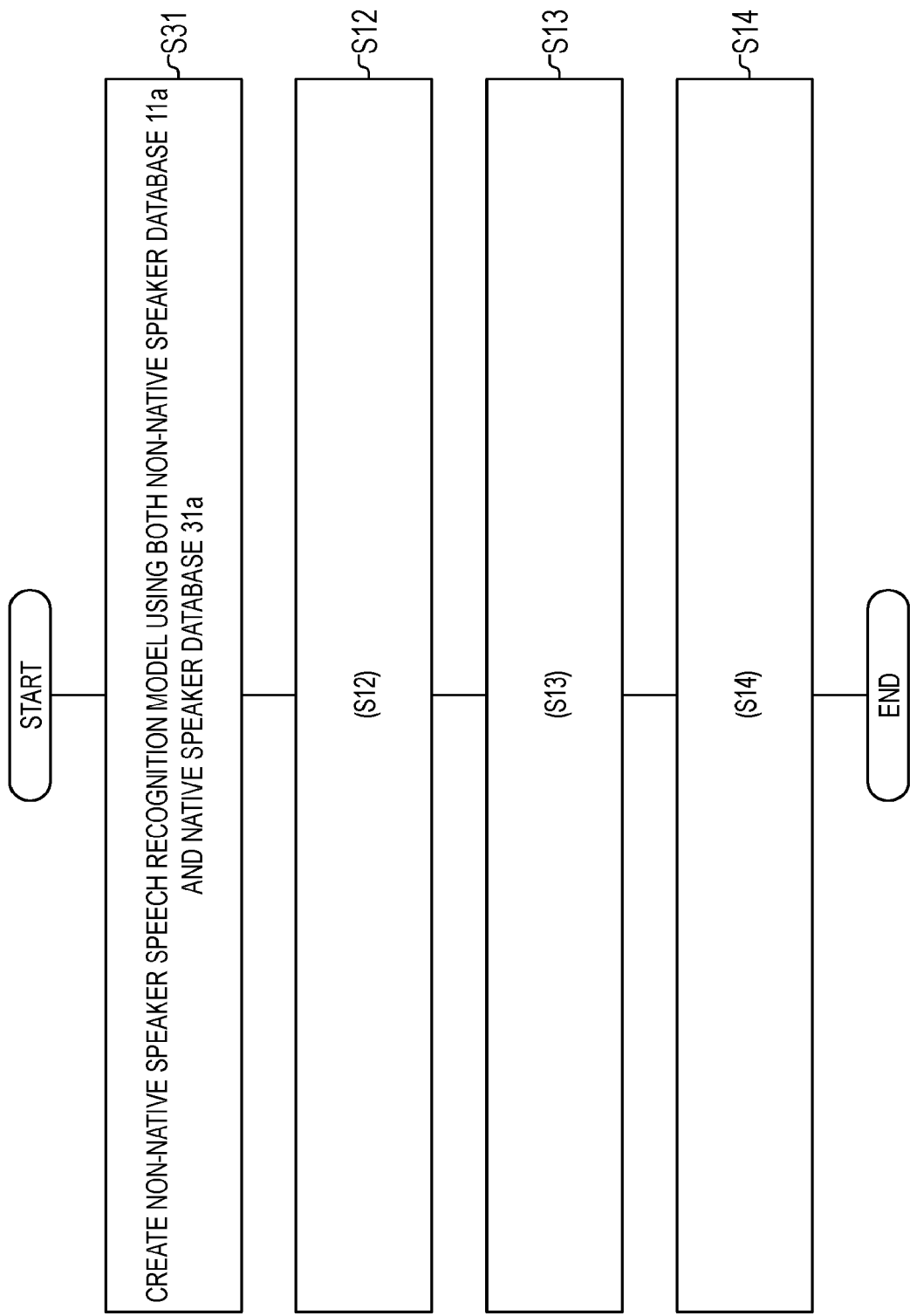
FIG. 7 is a flowchart illustrating operation of the pronunciation error detection apparatus of the third embodiment.

As shown in FIG. 6, the pronunciation error detection apparatus 3 of the present embodiment includes the non-native speaker database 11a, a native speaker database 31a, a model creation part 31, the first recognition model storage part 12a, the speech recognition part 12, the threshold storage part 13a, the reliability determination part 13, the second recognition model storage part 14a and the pronunciation error detection part 14. Hereinafter, operations of a non-native speaker speech recognition model which is a model different from that in the first embodiment, the native speaker database 31a and the model creation part 31 which are components different from those in the first embodiment will be described.

<Non-Native Speaker Speech Recognition Model>

In the present embodiment, the non-native speaker speech recognition model performs learning using native speakers' data in addition to non-native speakers' data. A distribution ratio of non-native speakers' data used for learning of the non-native speaker speech recognition model and native speakers' data used for the same learning may be a set value corresponding to the skill of a target learner (when the non-native language is assumed to be English, for example, TOEIC score, grade of the English proficiency test, stay history in an English speaking region or the like).

<Native Speaker Database 31a>

The native speaker database 31a stores a large number of sets of native speakers' speech data and corresponding transcript text (correct text).

<Model Creation Part 31>

The model creation part 31 creates the aforementioned non-native speaker speech recognition model using both the non-native speaker database 11a and the native speaker database 31a (S31). The model creation part 31 may adjust the amount of native speakers' data so as to have a data time length equal to or less than that of non-native speakers' data to thereby prevent non-native speakers' speech recognition accuracy from deteriorating. As described above, the amount of native speakers' data to be added may be adjusted depending on a skill level distribution of the target learner. For example, when there are many low skill learners, the amount of native speakers' data may be reduced.

In the above balance adjustment, the overall time length of data may be adjusted to be equal between a non-native speaker and a native speaker. When the data time length per word or phoneme is adjusted to be equal, it is possible to suppress the influence due to the difference in word or phoneme.

Generally, since there is more native speakers' speech data than non-native speakers' speech data, native speakers' speech data can be more easily recorded and collected. Here, when a selection is made so that as many speakers as possible are mixed, the number of speakers can be increased, and so speaker variation is expanded and speech recognition accuracy is stabilized.

According to the pronunciation error detection apparatus 3 of the present embodiment, in addition to the effects of the first embodiment, it is possible to adjust the non-native speaker speech recognition model according to the skill of a target learner.

Fourth Embodiment

Hereinafter, in addition to the functions of the first embodiment, a configuration and operation of a pronunciation error detection apparatus of a fourth embodiment configured to select, in advance, data whose score (reliability) decreases in a native speaker acoustic model will be described with reference to FIG. 8 and FIG. 9.

Figure 8:
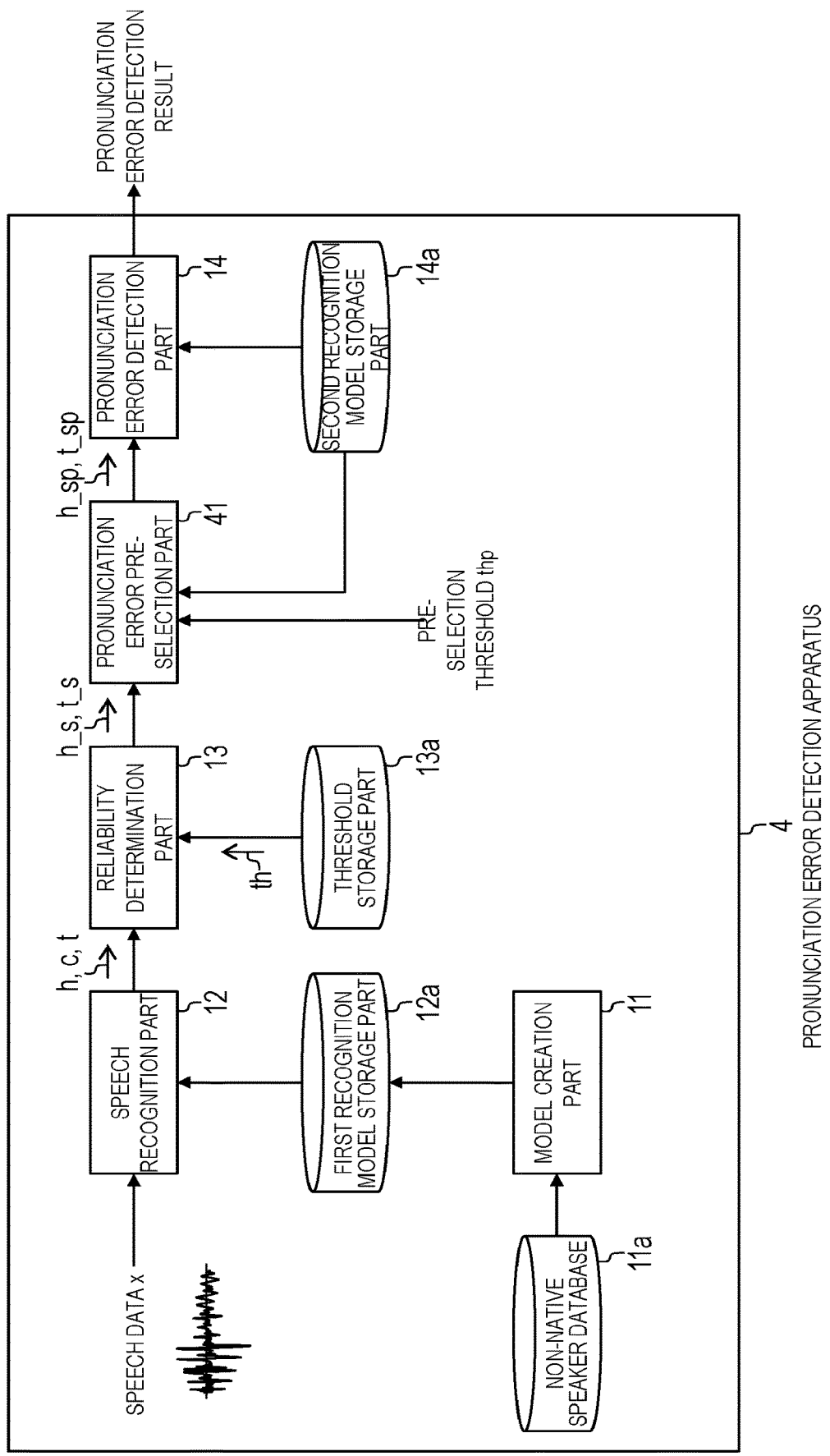
FIG. 8 is a block diagram illustrating a configuration of a pronunciation error detection apparatus of a fourth embodiment.
Figure 9:
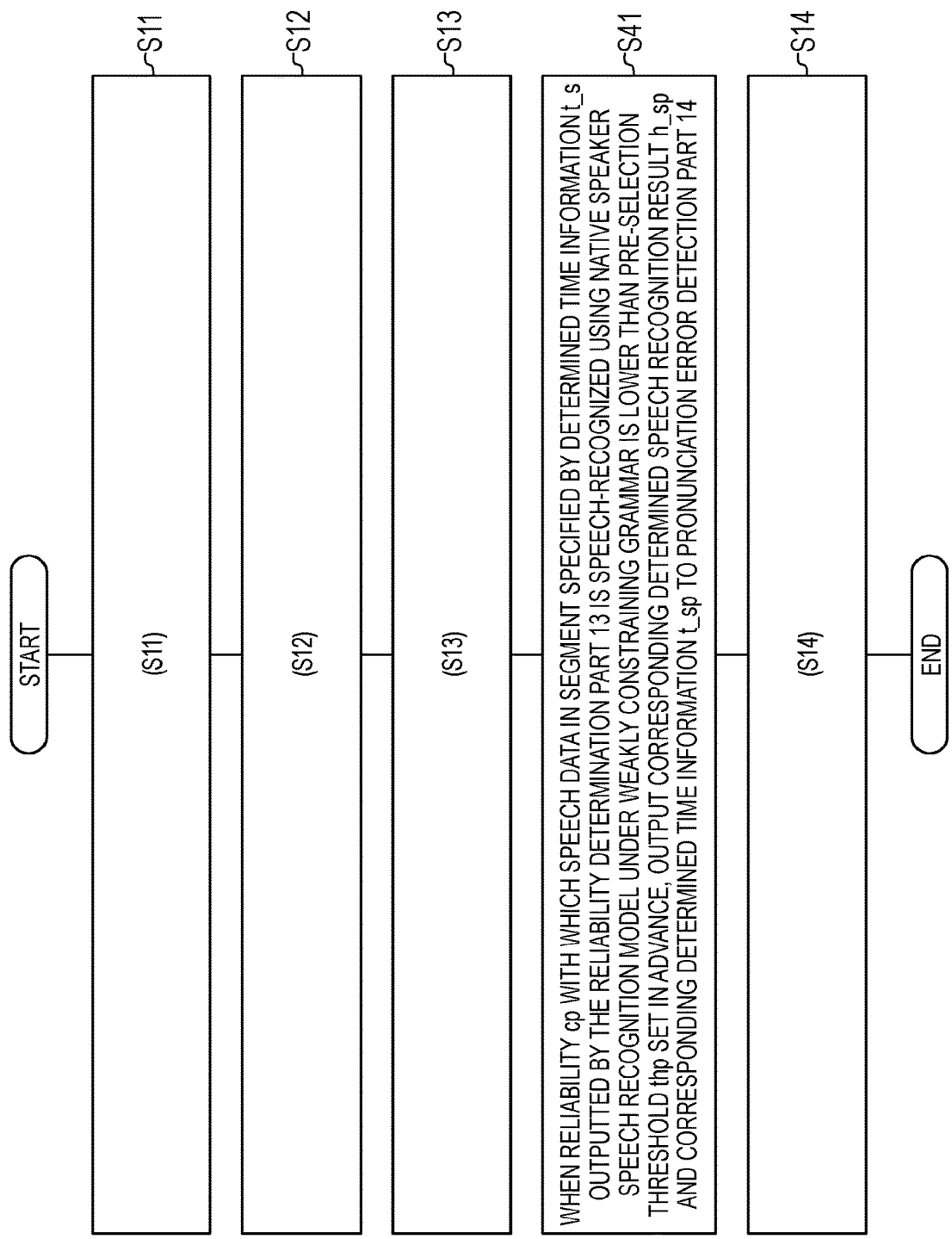
FIG. 9 is a flowchart illustrating operation of the pronunciation error detection apparatus of the fourth embodiment.

As shown in FIG. 8, the pronunciation error detection apparatus 4 of the present embodiment includes the non-native speaker database 11a, the model creation part 11, the first recognition model storage part 12a, the speech recognition part 12, the threshold storage part 13a, the reliability determination part 13, a pronunciation error pre-selection part 41, the second recognition model storage part 14a and the pronunciation error detection part 14. Hereinafter, operation of the pronunciation error pre-selection part 41 which is a component different from those in the first embodiment will be described.

<Pronunciation Error Pre-Selection Part 41>

When reliability cp speech-recognized using a native speaker speech recognition model under a weakly constraining grammar is lower than a pre-selection threshold thp set in advance with respect to speech data in a segment specified by the determined time information is outputted by the reliability determination part 13, the pronunciation error pre-selection part 41 outputs the corresponding determined speech recognition result h_sp and the corresponding determined time information t_sp to the pronunciation error detection part 14 (S41).

Note that in step S41, the difference in scores between the native speaker acoustic model and the non-native speaker acoustic model may be used instead of the posterior probability of the native speaker speech recognition model under a weakly constraining grammar.

According to the pronunciation error detection apparatus 4 of the present embodiment, in addition to the effects of the first embodiment, it is possible to pre-select a pronunciation error detection target.

Fifth Embodiment

Hereinafter, in addition to the functions of the fourth embodiment, a configuration and operation of a pronunciation error detection apparatus of a fifth embodiment configured to limit the number of detection results of pronunciation errors e to a predetermined number N and output the detection results will be described with reference to FIG. 10 and FIG. 11.

Figure 10:
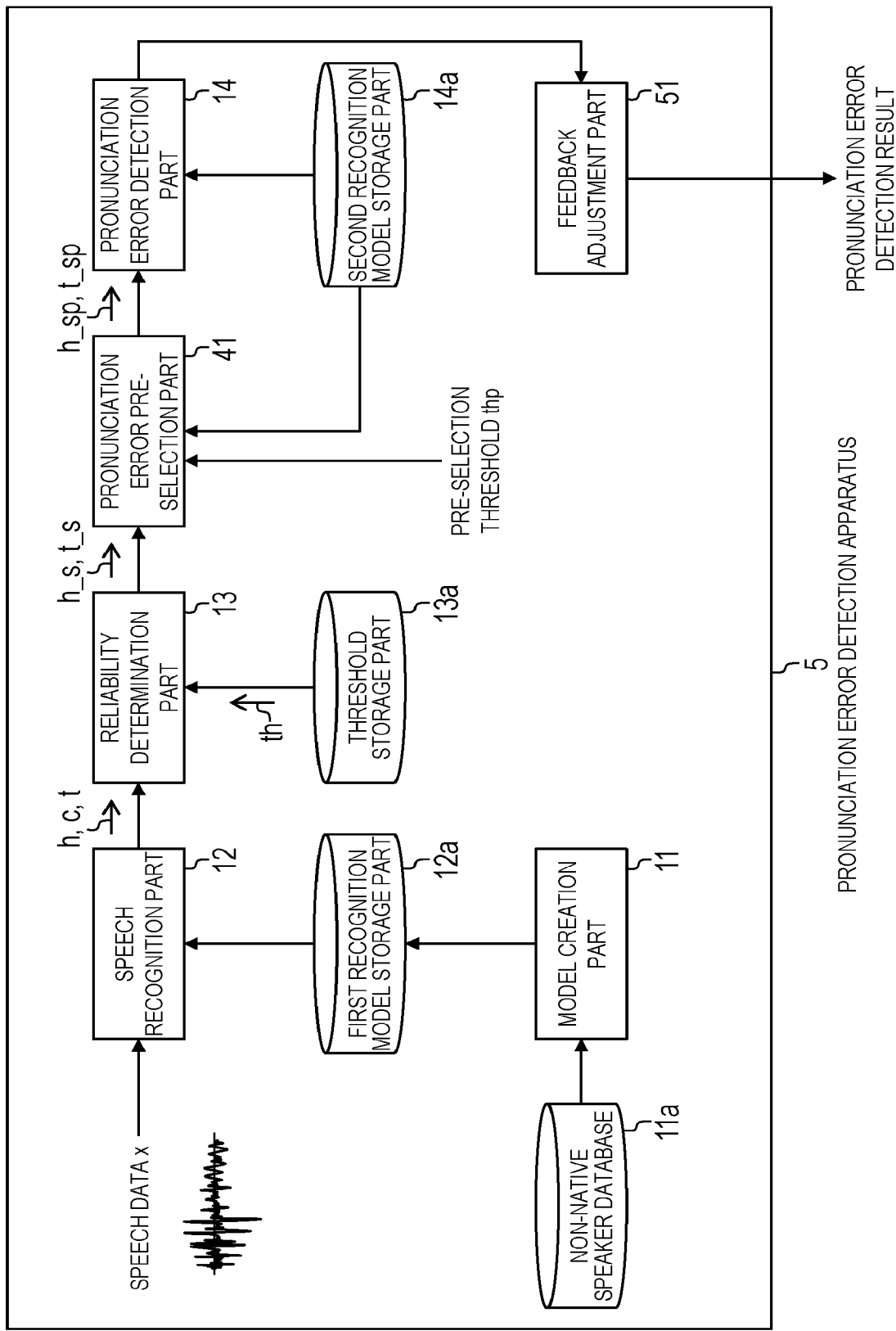
FIG. 10 is a block diagram illustrating a configuration of a pronunciation error detection apparatus of a fifth embodiment.
Figure 11:
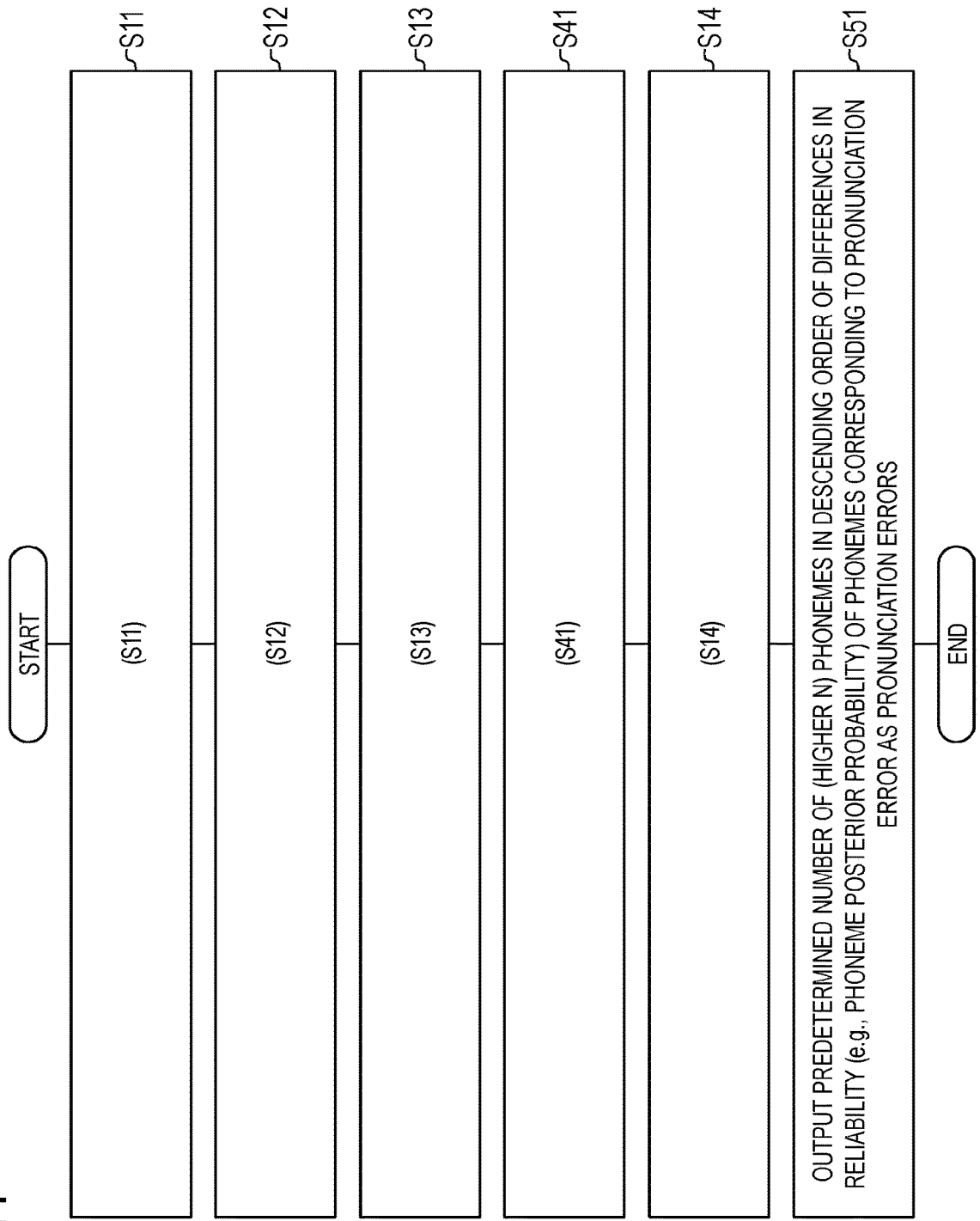
FIG. 11 is a flowchart illustrating operation of the pronunciation error detection apparatus of the fifth embodiment.

As shown in FIG. 10, the pronunciation error detection apparatus 5 of the present embodiment includes the non-native speaker database 11a, the model creation part 11, the first recognition model storage part 12a, the speech recognition part 12, the threshold storage part 13a, the reliability determination part 13, the pronunciation error pre-selection part 41, the second recognition model storage part 14a, the pronunciation error detection part 14, and a feedback adjustment part 51. Hereinafter, operation of the feedback adjustment part 51 which is a component different from those in the fourth embodiment will be described.

<Feedback Adjustment Part 51>

The feedback adjustment part 51 outputs a predetermined number of (higher N) phonemes in descending order of differences in reliability (e.g., phoneme posterior probability) of the phonemes corresponding to the pronunciation error as pronunciation errors (S51).

According to the pronunciation error detection apparatus 5 of the present embodiment, in addition to the effects of the fourth embodiment, it is possible to limit the number of detection results of pronunciation errors e to a predetermined number N and select pronunciation errors so as not to excessively point them out.

Sixth Embodiment

Hereinafter, in addition to the functions of the fifth embodiment, a configuration and operation of a pronunciation error detection apparatus according to a sixth embodiment configured to output pronunciation errors e with pronunciation error tendency specific to non-native speakers taken into account will be described with reference to FIG. 12 and FIG. 13.

Figure 12:
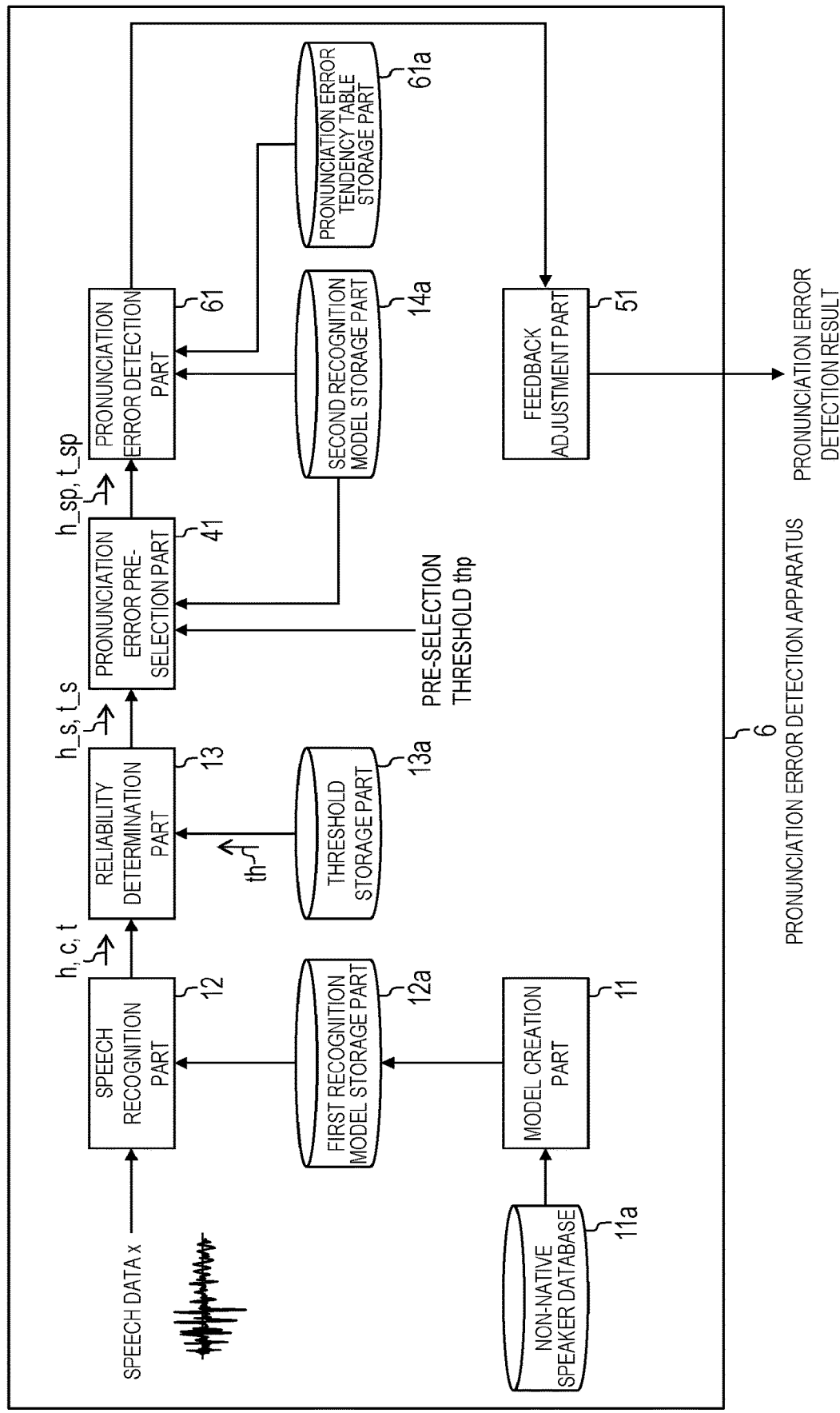
FIG. 12 is a block diagram illustrating a configuration of a pronunciation error detection apparatus of a sixth embodiment.
Figure 13:
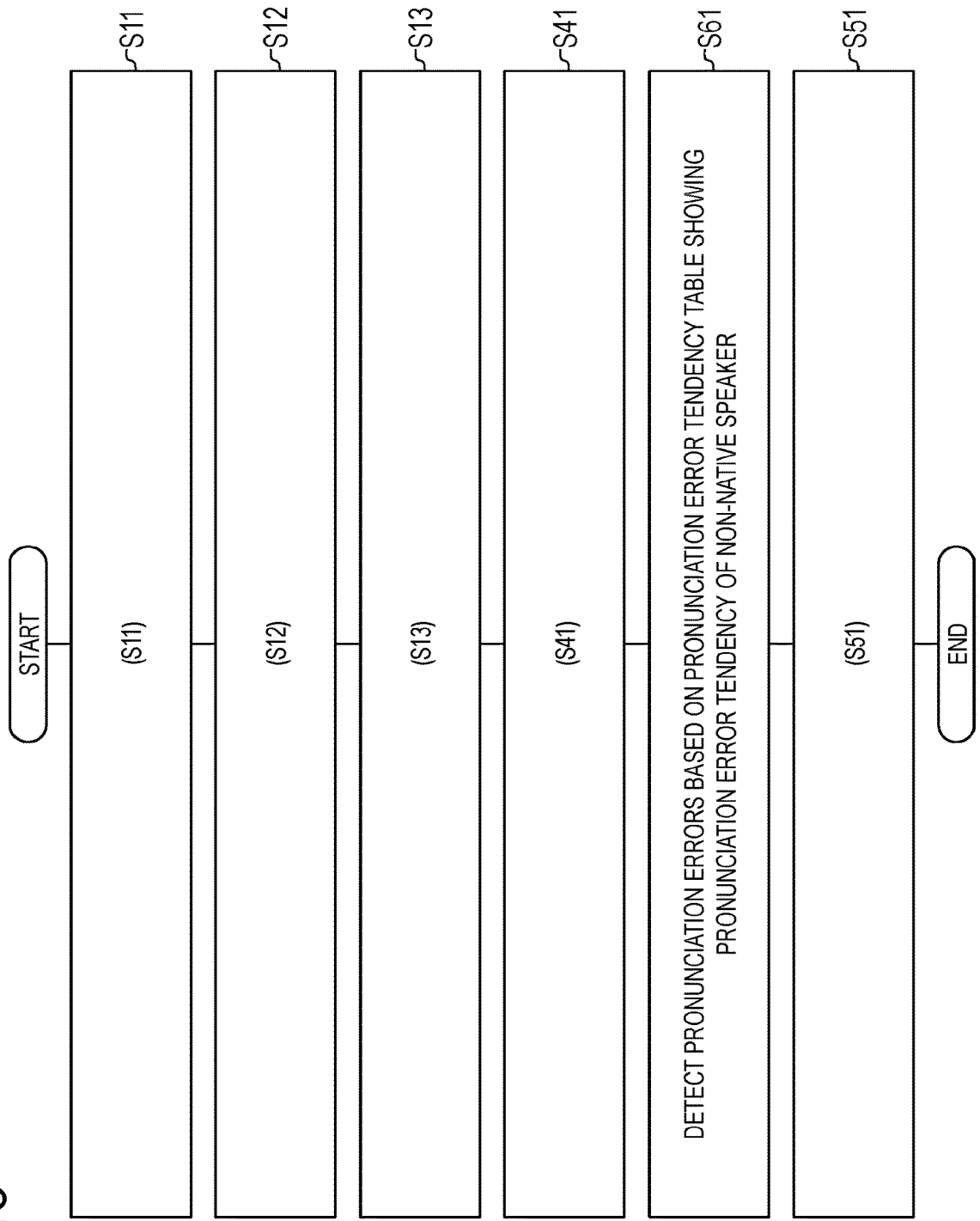
FIG. 13 is a flowchart illustrating operation of the pronunciation error detection apparatus of the sixth embodiment.

As shown in FIG. 12, the pronunciation error detection apparatus 6 of the present embodiment includes the non-native speaker database 11a, the model creation part 11, the first recognition model storage part 12a, the speech recognition part 12, the threshold storage part 13a, the reliability determination part 13, the pronunciation error pre-selection part 41, the second recognition model storage part 14a, a pronunciation error tendency table storage part 61a, a pronunciation error detection part 61 and the feedback adjustment part 51. Hereinafter, operations of the pronunciation error tendency table storage part 61a and the pronunciation error detection part 61 which are components different from those in the fifth embodiment will be described.

<Pronunciation Error Tendency Table Storage Part 61a>

The pronunciation error tendency table storage part 61a stores a pronunciation error tendency table in advance. The pronunciation error tendency table is a table showing a pronunciation error tendency of a non-native speaker. Any method may be adopted as a method for creating the pronunciation error tendency table, and the pronunciation error tendency table may be created by comparing a recognition result of speech recognition using a low constraint grammar-native speaker acoustic model (that is, native speaker speech recognition model under a weakly constraining grammar of the first embodiment or the like), for example, on the non-native speaker database 11a and a correct phoneme obtained from a correct text to thereby extract a pronunciation error tendency of non-native speakers and based on the extracted pronunciation error tendency.

<Pronunciation Error Detection Part 61>

The pronunciation error detection part 61 detects pronunciation errors based on the pronunciation error tendency table showing a pronunciation error tendency of non-native speakers (S61). More specifically, the pronunciation error detection part 61 performs speech recognition according to a grammatical error considering grammar (e.g., grammar responding to an utterance of rock (/rak/), with /(r|l)ak/) with a possibility of only phoneme errors included in the pronunciation error tendency table taken into account instead of low constraint grammar recognition for speech data in a segment specified by determined time information t_s. When a phoneme sequence included in the determined speech recognition result h_s is assumed to be a correct phoneme sequence, the pronunciation error detection part 61 outputs a recognition phoneme which becomes a higher score than the correct phoneme sequence score (of grammatical error considering grammar) as a pronunciation error result.

According to the pronunciation error detection apparatus 6 of the present embodiment, in addition to the effects of the fifth embodiment, it is possible to consider a pronunciation error tendency specific to non-native speakers.

<Additional Information>

The apparatus of the present invention includes, as a single hardware entity, an input part to which a keyboard or the like is connectable, an output part to which a liquid crystal display or the like is connectable, a communication part to which a communicable communication apparatus (e.g., communication cable) is connectable outside the hardware entity, a CPU (Central Processing Unit, may also be provided with a cache memory, register or the like), a RAM or ROM which is a memory, an external storage apparatus which is a hard disk and a bus connecting the input part, output part, communication part, CPU, RAM, ROM and external storage apparatus so as to enable data to be exchanged among these components. The hardware entity may be provided with an apparatus (drive) or the like which can read/write data from/to a recording medium such as CD-ROM. An example of a physical entity provided with such hardware resources is a general-purpose computer.

The external storage apparatus of the hardware entity stores a program necessary to implement the above functions and data or the like necessary to process the program (for example, a program may be stored in a ROM which is a read-only storage apparatus, without being limited to the external storage apparatus). The data or the like obtained by processing the program is stored in a RAM, an external storage apparatus or the like as appropriate.

In the hardware entity, each program and data necessary for processing each program stored in the external storage apparatus (or ROM or the like) are read into memory as required and interpreted, executed and processed by the CPU as appropriate. As a result, the CPU implements predetermined functions (respective components represented above as . . . parts, . . . means or the like).

The present invention is not limited to the above embodiments, but can be changed as appropriate without departing from the spirit and scope of the present invention. The processes described in the above embodiments may not only be executed in time-series order according to the description, but also be executed in parallel or individually according to a processing capacity of the apparatus that executes the processes or as required.

As has already been described, when the processing functions in the hardware entity (apparatus of the present invention) described in the above embodiments are implemented by a computer, processing contents of the functions to be possessed by the hardware entity are described in a program. The processing functions in the above hardware entity are implemented on a computer by the computer executing this program.

The program describing the processing contents can be recorded in a computer-readable recording medium. Examples of such a computer-readable recording medium may include a magnetic recording apparatus, an optical disk, a magnetooptical recording medium, a semiconductor memory or any type of medium. More specifically, it is possible to use a hard disk drive, a flexible disk, a magnetic tape or the like as the magnetic recording apparatus, a DVD (Digital Versatile Disc), a DVD-RAM (Random Access Memory), a CD-ROM (Compact Disc Read Only Memory), a CD-R (Recordable)/RW (ReWritable) or the like as the optical disk, an MO (Magneto-Optical disc) or the like as the magnetooptical recording medium, and an EEP-ROM (Electronically Erasable and Programmable-Read Only Memory) or the like as the semiconductor memory.

This program is circulated through, for example, sales, transfer or rent of a portable recording medium such as DVD, CD-ROM that records the program. The program may also be circulated by storing the program in a storage apparatus of a server computer, and transferring the program from the server computer to another computer via a network.

The computer that executes such a program temporarily stores a program recorded in a portable recording medium or a program transferred from the server computer in the own storage apparatus. At the time of executing the process, this computer reads the program stored in the own recording medium and executes the process according to the read program. As another form of implementation of the program, the computer may read the program directly from a portable recording medium and may execute the process according to the program. Furthermore, every time the program is transferred to the computer from the server computer, the process may be executed successively according to the received program. The above-described process may be executed by a so-called ASP (Application Service Provider) type service in which without the server computer transferring the program to the computer, the processing function is implemented only by instructing execution and acquiring the result. Note that the program includes a semi-program which is information used for processing by a computer (data which is not a direct instruction on the computer but has a characteristic of defining processing of the computer).

In the present embodiment, although the hardware entity is configured by executing a predetermined program on the computer, at least some of these processing contents may be implemented by hardware.

What is claimed is:

1. A pronunciation error detection apparatus comprising:
   processing circuitry configured to
   store a non-native speaker speech recognition model comprising a non-native speaker acoustic model learned using non-native speakers' data and a language model of a corresponding language;
   perform speech recognition on speech data based on the non-native speaker speech recognition model and output speech recognition results, reliability and time information of the speech recognition results;
   output the speech recognition results with the reliability higher than a predetermined threshold and the corresponding time information as determined speech recognition results and determined time information;
   store a native speaker speech recognition model under a weakly constraining grammar comprising a native speaker acoustic model learned using native speakers' data and a language model under a weakly constraining grammar having fewer grammar constraints than the language model; and
   output a phoneme as a pronunciation error when reliability for each phoneme in the speech recognition results using the native speaker speech recognition model under a weakly constraining grammar is greater than the reliability of the corresponding phoneme in the speech recognition results using the native speaker acoustic model under a constraining grammar in which the determined speech recognition results are correct for the speech data in a segment specified by the determined time information.

2. The pronunciation error detection apparatus according to claim 1, further comprising:
   a non-native speaker database that stores a set of the non-native speakers' speech data and a correct text;
   wherein the processing circuitry is configured to estimate the threshold to satisfy target accuracy which is target speech recognition accuracy based on reliability of a recognition result of recognizing each piece of the speech data of the non-native speaker database according to the non-native speaker speech recognition model, the threshold being set in advance with respect to the reliability and a relationship with speech recognition accuracy determined by a percentage of correct answers of the recognition results whose reliability is equal to or higher than the threshold.

3. The pronunciation error detection apparatus according to claim 2, wherein the non-native speaker speech recognition model learns using native speakers' data in addition to non-native speakers' data, and
   a distribution ratio of the non-native speakers' data used for learning of the non-native speaker speech recognition model and the native speakers' data used for the same learning is a set value corresponding to skill of a target learner.

4. The pronunciation error detection apparatus according to claim 2, wherein the processing circuitry outputs, when reliability with which the speech data in a segment specified by the determined time information outputted by the reliability determination part is speech-recognized using the native speaker speech recognition model under a weakly constraining grammar is lower than a pre-selection threshold set in advance, the corresponding determined speech recognition results and the corresponding determined time information.

5. The pronunciation error detection apparatus according to claim 2, wherein the processing circuitry outputs a predetermined number of phonemes in descending order of differences in reliability of the phonemes corresponding to the pronunciation error as pronunciation errors.

6. The pronunciation error detection apparatus according to claim 2, wherein the processing circuitry detects the pronunciation error based on a pronunciation error tendency table showing a pronunciation error tendency of the non-native speakers.

7. The pronunciation error detection apparatus according to claim 2, wherein the processing circuitry executes at least any one of a process of outputting a correct sentence and a process of outputting speech synthesized from the correct sentence and speech synthesized from a sentence including the pronunciation errors in a comparable form.

8. The pronunciation error detection apparatus according to claim 1, wherein the non-native speaker speech recognition model learns using native speakers' data in addition to non-native speakers' data, and
   a distribution ratio of the non-native speakers' data used for learning of the non-native speaker speech recognition model and the native speakers' data used for the same learning is a set value corresponding to skill of a target learner.

9. The pronunciation error detection apparatus according to claim 8, wherein the processing circuitry outputs, when reliability with which the speech data in a segment specified by the outputted determined time information is speech-recognized using the native speaker speech recognition model under a weakly constraining grammar is lower than a pre-selection threshold set in advance, the corresponding determined speech recognition results and the corresponding determined time information to the pronunciation error.

10. The pronunciation error detection apparatus according to claim 8, wherein the processing circuitry outputs a predetermined number of phonemes in descending order of differences in reliability of the phonemes corresponding to the pronunciation error as pronunciation errors.

11. The pronunciation error detection apparatus according to claim 8, wherein the processing circuitry detects the pronunciation error based on a pronunciation error tendency table showing a pronunciation error tendency of the non-native speakers.

12. The pronunciation error detection apparatus according to claim 8, wherein the processing circuitry executes at least any one of a process of outputting a correct sentence and a process of outputting speech synthesized from the correct sentence and speech synthesized from a sentence including the pronunciation errors in a comparable form.

13. The pronunciation error detection apparatus according to claim 1, wherein the processing circuitry is configured to output, when reliability with which the speech data in a segment specified by the outputted determined time information is speech-recognized using the native speaker speech recognition model under a weakly constraining grammar is lower than a pre-selection threshold set in advance, the corresponding determined speech recognition results and the corresponding determined time information.

14. The pronunciation error detection apparatus according to claim 13, wherein the processing circuitry outputs a predetermined number of phonemes in descending order of differences in reliability of the phonemes corresponding to the pronunciation error as pronunciation errors.

15. The pronunciation error detection apparatus according to claim 13, wherein the processing circuitry detects the pronunciation error based on a pronunciation error tendency table showing a pronunciation error tendency of the non-native speakers.

16. The pronunciation error detection apparatus according to claim 13, wherein the processing circuitry executes at least any one of a process of outputting a correct sentence and a process of outputting speech synthesized from the correct sentence and speech synthesized from a sentence including the pronunciation errors in a comparable form.

17. The pronunciation error detection apparatus according to claim 1, wherein the processing circuitry is configured to output a predetermined number of phonemes in descending order of differences in reliability of the phonemes corresponding to the pronunciation error as pronunciation errors.

18. The pronunciation error detection apparatus according to claim 17, wherein the processing circuitry detects the pronunciation error based on a pronunciation error tendency table showing a pronunciation error tendency of the non-native speakers.

19. The pronunciation error detection apparatus according to claim 17, wherein the processing circuitry executes at least any one of a process of outputting a correct sentence and a process of outputting speech synthesized from the correct sentence and speech synthesized from a sentence including the pronunciation errors in a comparable form.

20. The pronunciation error detection apparatus according to claim 1, wherein the processing circuitry detects the pronunciation error based on a pronunciation error tendency table showing a pronunciation error tendency of the non-native speakers.

21. The pronunciation error detection apparatus according to claim 20, wherein the processing circuitry executes at least any one of a process of outputting a correct sentence and a process of outputting speech synthesized from the correct sentence and speech synthesized from a sentence including the pronunciation errors in a comparable form.

22. The pronunciation error detection apparatus according to claim 1, wherein the processing circuitry executes at least any one of a process of outputting a correct sentence and a process of outputting speech synthesized from the correct sentence and speech synthesized from a sentence including the pronunciation errors in a comparable form.

23. A pronunciation error detection method executed by a pronunciation error detection apparatus, the method comprising:
    a step of performing speech recognition on speech data based on a non-native speaker speech recognition model comprising a non-native speaker acoustic model learned using non-native speakers' data and a language model of the corresponding language and outputting speech recognition results, reliability and time information of the speech recognition results;
    a step of outputting the speech recognition results with higher reliability than a predetermined threshold and the corresponding time information as determined speech recognition results and determined time information; and
    a step of outputting a phoneme as a pronunciation error, when reliability for each phoneme in speech recognition results for the speech data in a segment specified by the determined time information using a native speaker speech recognition model under a weakly constraining grammar comprising the native speaker acoustic model learned using the native speakers' data and a language model under a weakly constraining grammar with fewer grammar constraints than the language model is greater than the reliability of the corresponding phoneme of the speech recognition results by the native speaker acoustic model under grammar constraints under which the determined speech recognition results are correct.

24. The pronunciation error detection method according to claim 23, wherein at least any one of a process of outputting a correct sentence and a process of outputting speech synthesized from the correct sentence and speech synthesized from a sentence including the pronunciation errors in a comparable form is executed.

25. A non-transitory computer-readable medium that stores a program for causing a computer to function as a pronunciation error detection apparatus comprising:
    processing circuitry configured to
        store a non-native speaker speech recognition model comprising a non-native speaker acoustic model learned using non-native speakers' data and a language model of a corresponding language;
        perform speech recognition on speech data based on the non-native speaker speech recognition model and outputs speech recognition results, reliability and time information of the speech recognition results;
        output the speech recognition results with the reliability higher than a predetermined threshold and the corresponding time information as determined speech recognition results and determined time information;
        store a native speaker speech recognition model under a weakly constraining grammar comprising a native speaker acoustic model learned using native speakers' data and a language model under a weakly constraining grammar having fewer grammar constraints than the language model; and output a phoneme as a pronunciation error when reliability for each phoneme in the speech recognition results using the native speaker speech recognition model under a weakly constraining grammar is greater than the reliability of the corresponding phoneme in the speech recognition results using the native speaker acoustic model under a constraining grammar in which the determined speech recognition results are correct for the speech data in a segment specified by the determined time information.

26. A non-transitory computer-readable medium that stores a program for causing a computer to function as a pronunciation error detection apparatus comprising:

processing circuitry configured to store a non-native speaker speech recognition model comprising a non-native speaker acoustic model learned using non-native speakers' data and a language model of a corresponding language;

perform speech recognition on speech data based on the non-native speaker speech recognition model and outputs speech recognition results, reliability and time information of the speech recognition results;

output the speech recognition results with the reliability higher than a predetermined threshold and the corresponding time information as determined speech recognition results and determined time information;

store a native speaker speech recognition model under a weakly constraining grammar comprising a native speaker acoustic model learned using native speakers' data and a language model under a weakly constraining grammar having fewer grammar constraints than the language model; and output a phoneme as a pronunciation error when reliability for each phoneme in the speech recognition results using the native speaker speech recognition model under a weakly constraining grammar is greater than the reliability of the corresponding phoneme in the speech recognition results using the native speaker acoustic model under a constraining grammar in which the determined speech recognition results are correct for the speech data in a segment specified by the determined time information, the pronunciation error detection apparatus further comprising:

a non-native speaker database that stores a set of the non-native speakers' speech data and a correct text;

wherein the processing circuitry is configured to estimate the threshold to satisfy target accuracy which is target speech recognition accuracy based on reliability of a recognition result of recognizing each piece of the speech data of the non-native speaker database according to the non-native speaker speech recognition model, the threshold being set in advance with respect to the reliability and a relationship with speech recognition accuracy determined by a percentage of correct answers of the recognition results whose reliability is equal to or higher than the threshold.

27. A non-transitory computer-readable medium that stores a program for causing a computer to function as a pronunciation error detection apparatus comprising:

processing circuitry configured to store a non-native speaker speech recognition model comprising a non-native speaker acoustic model learned using non-native speakers' data and a language model of a corresponding language;

perform speech recognition on speech data based on the non-native speaker speech recognition model and outputs speech recognition results, reliability and time information of the speech recognition results;

output the speech recognition results with the reliability higher than a predetermined threshold and the corresponding time information as determined speech recognition results and determined time information;

store a native speaker speech recognition model under a weakly constraining grammar comprising a native speaker acoustic model learned using native speakers' data and a language model under a weakly constraining grammar having fewer grammar constraints than the language model; and output a phoneme as a pronunciation error when reliability for each phoneme in the speech recognition results using the native speaker speech recognition model under a weakly constraining grammar is greater than the reliability of the corresponding phoneme in the speech recognition results using the native speaker acoustic model under a constraining grammar in which the determined speech recognition results are correct for the speech data in a segment specified by the determined time information, wherein the non-native speaker speech recognition model learns using native speakers' data in addition to non-native speakers' data, and a distribution ratio of the non-native speakers' data used for learning of the non-native speaker speech recognition model and the native speakers' data used for the same learning is a set value corresponding to skill of a target learner.

28. A non-transitory computer-readable medium that stores a program for causing a computer to function as a pronunciation error detection apparatus comprising:

processing circuitry configured to store a non-native speaker speech recognition model comprising a non-native speaker acoustic model learned using non-native speakers' data and a language model of a corresponding language;

perform speech recognition on speech data based on the non-native speaker speech recognition model and outputs speech recognition results, reliability and time information of the speech recognition results;

output the speech recognition results with the reliability higher than a predetermined threshold and the corresponding time information as determined speech recognition results and determined time information;

store a native speaker speech recognition model under a weakly constraining grammar comprising a native speaker acoustic model learned using native speakers' data and a language model under a weakly constraining grammar having fewer grammar constraints than the language model; and output a phoneme as a pronunciation error when reliability for each phoneme in the speech recognition results using the native speaker speech recognition model under a weakly constraining grammar is greater than the reliability of the corresponding phoneme in the speech recognition results using the native speaker acoustic model under a constraining grammar in which the determined speech recognition results are correct for the speech data in a segment specified by the determined time information, wherein the processing circuitry is configured to output, when reliability with which the speech data in a segment specified by the outputted determined time information is speech-recognized using the native speaker speech recognition model under a weakly constraining grammar is lower than a pre-selection threshold set in advance, the corresponding determined speech recognition results and the corresponding determined time information.

29. A non-transitory computer-readable medium that stores a program for causing a computer to function as a pronunciation error detection apparatus comprising:

processing circuitry configured to store a non-native speaker speech recognition model comprising a non-native speaker acoustic model learned using non-native speakers' data and a language model of a corresponding language;

perform speech recognition on speech data based on the non-native speaker speech recognition model and outputs speech recognition results, reliability and time information of the speech recognition results;

output the speech recognition results with the reliability higher than a predetermined threshold and the corresponding time information as determined speech recognition results and determined time information;

store a native speaker speech recognition model under a weakly constraining grammar comprising a native speaker acoustic model learned using native speakers' data and a language model under a weakly constraining grammar having fewer grammar constraints than the language model; and output a phoneme as a pronunciation error when reliability for each phoneme in the speech recognition results using the native speaker speech recognition model under a weakly constraining grammar is greater than the reliability of the corresponding phoneme in the speech recognition results using the native speaker acoustic model under a constraining grammar in which the determined speech recognition results are correct for the speech data in a segment specified by the determined time information, wherein the processing circuitry is configured to output a predetermined number of phonemes in descending order of differences in reliability of the phonemes corresponding to the pronunciation error as pronunciation errors.

30. A non-transitory computer-readable medium that stores a program for causing a computer to function as a pronunciation error detection apparatus comprising:

processing circuitry configured to store a non-native speaker speech recognition model comprising a non-native speaker acoustic model learned using non-native speakers' data and a language model of a corresponding language;

perform speech recognition on the speech data based on the non-native speaker speech recognition model and outputs speech recognition results, reliability and time information of the speech recognition results;

output the speech recognition results with the reliability higher than a predetermined threshold and the corresponding time information as determined speech recognition results and determined time information;

store a native speaker speech recognition model under a weakly constraining grammar comprising a native speaker acoustic model learned using native speakers' data and a language model under a weakly constraining grammar having fewer grammar constraints than the language model; and output a phoneme as a pronunciation error when reliability for each phoneme in the speech recognition results using the native speaker speech recognition model under a weakly constraining grammar is greater than the reliability of the corresponding phoneme in the speech recognition results using the native speaker acoustic model under a constraining grammar in which the determined speech recognition results are correct for the speech data in a segment specified by the determined time information, wherein the processing circuitry detects the pronunciation error based on a pronunciation error tendency table showing a pronunciation error tendency of the non-native speakers.

31. A non-transitory computer-readable medium that stores a program for causing a computer to function as a pronunciation error detection apparatus comprising:

processing circuitry configured to store a non-native speaker speech recognition model comprising a non-native speaker acoustic model learned using non-native speakers' data and a language model of a corresponding language;

perform speech recognition on speech data based on the non-native speaker speech recognition model and outputs speech recognition results, reliability and time information of the speech recognition results;

output the speech recognition results with the reliability higher than a predetermined threshold and the corresponding time information as determined speech recognition results and determined time information;

store a native speaker speech recognition model under a weakly constraining grammar comprising a native speaker acoustic model learned using native speakers' data and a language model under a weakly constraining grammar having fewer grammar constraints than the language model; and output a phoneme as a pronunciation error when reliability for each phoneme in the speech recognition results using the native speaker speech recognition model under a weakly constraining grammar is greater than the reliability of the corresponding phoneme in the speech recognition results using the native speaker acoustic model under a constraining grammar in which the determined speech recognition results are correct for the speech data in a segment specified by the determined time information, wherein the processing circuitry executes at least any one of a process of outputting a correct sentence and a process of outputting speech synthesized from the correct sentence and speech synthesized from a sentence including the pronunciation errors in a comparable form.

* * * * *